(12) United States Patent
Sato et al.

(10) Patent No.: US 6,411,710 B1
(45) Date of Patent: Jun. 25, 2002

(54) VOICE RECEIVING MECHANISM AND HANDSET

(75) Inventors: Kazuhito Sato; Junya Ohmoto, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/465,267

(22) Filed: Dec. 17, 1999

(30) Foreign Application Priority Data

Dec. 18, 1998 (JP) ............................................. 10-360804

(51) Int. Cl.⁷ ................................................ H04M 1/00
(52) U.S. Cl. .................................................. 379/433.02
(58) Field of Search ............................ 379/430, 433.02; 455/90, 575

(56) References Cited

U.S. PATENT DOCUMENTS 6,097,809 A  *  8/2000  Lucey et al. ................. 379/430

* cited by examiner

*Primary Examiner*—Jack Chiang
*Assistant Examiner*—Rasha S Al Aubaidi
(74) *Attorney, Agent, or Firm*—Jay H. Maioli

(57) ABSTRACT

In a voice receiving mechanism and a handset, an ear pad and a speaker are secured to a ball of a ball joint, and a grip portion supports a ball holder of the ball joint. Therefore, the ear pad, and so on are swingable in any direction relative to the grip portion, and the ear pad, can be brought into close contact with the ear. Further, a leaf spring applies a braking force to the ball. So that, even after the ear pad is separated from the ear, the orientation (direction and angle) of the ear pad, can be kept so that the ear pad can come into close contact with the ear.

1 Claim, 3 Drawing Sheets

VOICE RECEIVING MECHANISM AND HANDSET

BACKGROUND OF THE INVENTION

1. Field of the Invention

The present invention relates to a voice receiving mechanism such as a telephone receiver, an earphone or the like for listening to received voices, and a handset for transmitting/receiving voices.

2. Description of the Related Art

In conventional handsets for telephones, radio equipment, etc., a voice receiving portion is fixed to a grip portion or the like of each handset, and thus the installation angle of the handset to the grip portion or the like cannot be adjusted.

However, the voice transmission/reception style (i.e., calling style) such as the attitude of a user, the orientation of the head of the user, the position of an arm of the user, etc. is varied every individual, and also the calling style is varied for during voice transmission/reception at all times although its variation is slight. Accordingly, with the conventional handsets, the voice receiving portion cannot be brought into close contact with the ear of the user, which causes leakage of received voices or invasion of external noises. Therefore, the user cannot listen to the received voices under good condition.

SUMMARY OF THE INVENTION

Therefore, the present invention has an object to provide a voice receiving mechanism and a handset which can suppress leakage of received voices and invasion of external noises so that a user can listen to the received voices under good condition, and also enable the user to immediately listen to received voices under good condition even when the voice reception is restarted, so that the user can listen to the voices naturally.

In order to attain the above object, according to a voice receiving mechanism of the present invention, a voice receiving portion is fixed to the ball of a ball joint, and a support portion supports the ball holder of the ball joint. Therefore, the voice receiving portion is secured so as to be swingable relative to the support portion in any direction. Specifically, if a user pushes his/her ear against the voice receiving portion and presses the voice receiving portion from the ear side, the user can swing the voice receiving portion in any direction relatively to the support portion. Accordingly, even when the calling style (voice transmission/reception attitude) is varied for every individual, or even when the calling style is varied during voice reception, the voice receiving portion can be brought into close contact with the user's ear at all times.

The voice receiving mechanism is further provided with a braking member which applies a braking force to the ball of the ball joint. Therefore, under such a condition that only gravitational force or some other small external force is applied to the voice receiving portion or the like, the swinging motion of the voice receiving portion relative to the support portion can be prevented. In addition, even once the voice receiving portion is separated from the user's ear, the orientation (the direction and angle) of the voice receiving portion which has been brought into contact with the user's ear previously can be kept.

BRIEF DESCRIPTION OF THE DRAWINGS

FIGS. 1A and 1B are diagrams showing the main part of an embodiment of the present invention, wherein FIG. 1A is a cross-sectional view taken along a line A—A of FIG. 2 and FIG. 1B is a cross-sectional view taken along a line B—B of FIG. 2 ;

DETAILED DESCRIPTION OF THE PREFERRED EMBODIMENT

A preferred embodiment according to the present invention will be described hereunder with reference to the accompanying drawings.

Figure 1A:
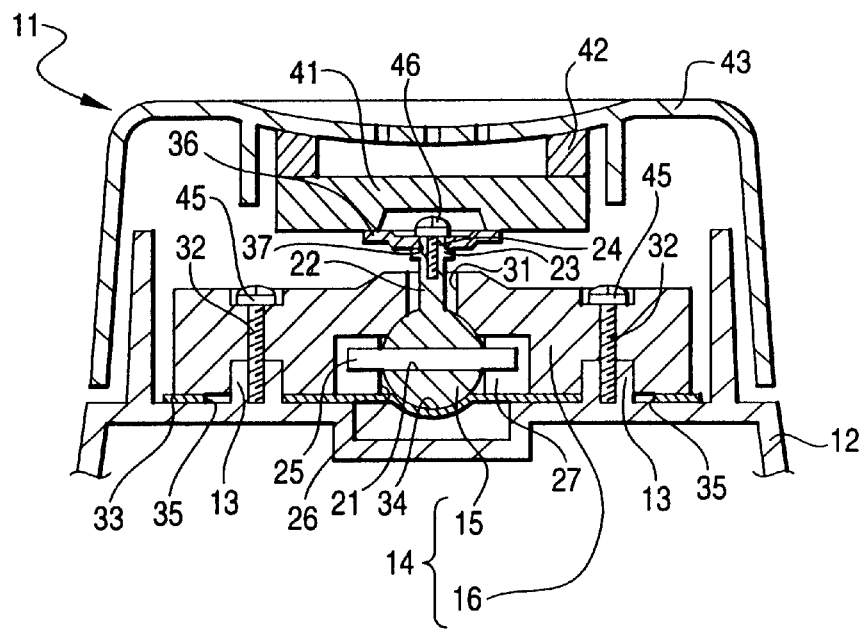
Figure 1B:
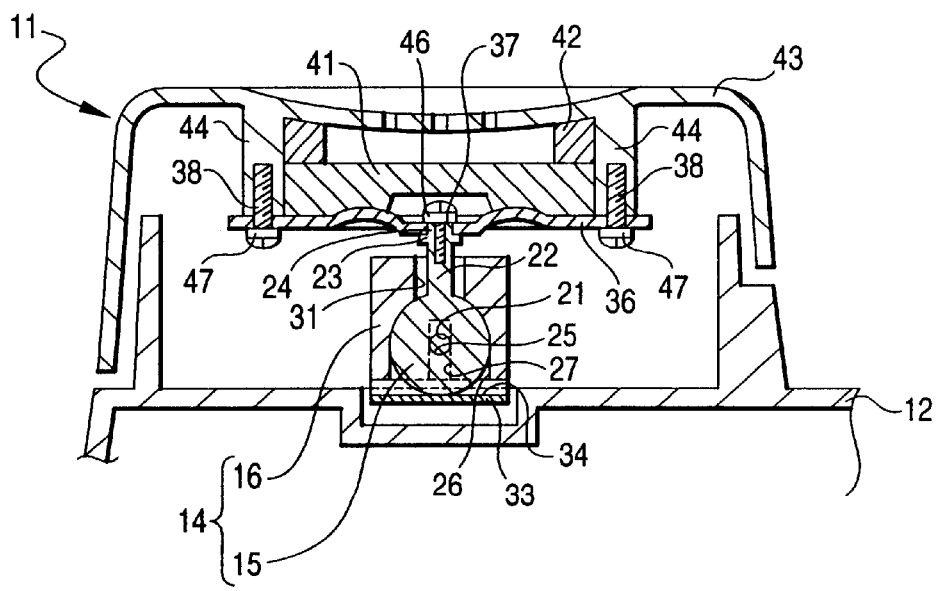
Figure 2:
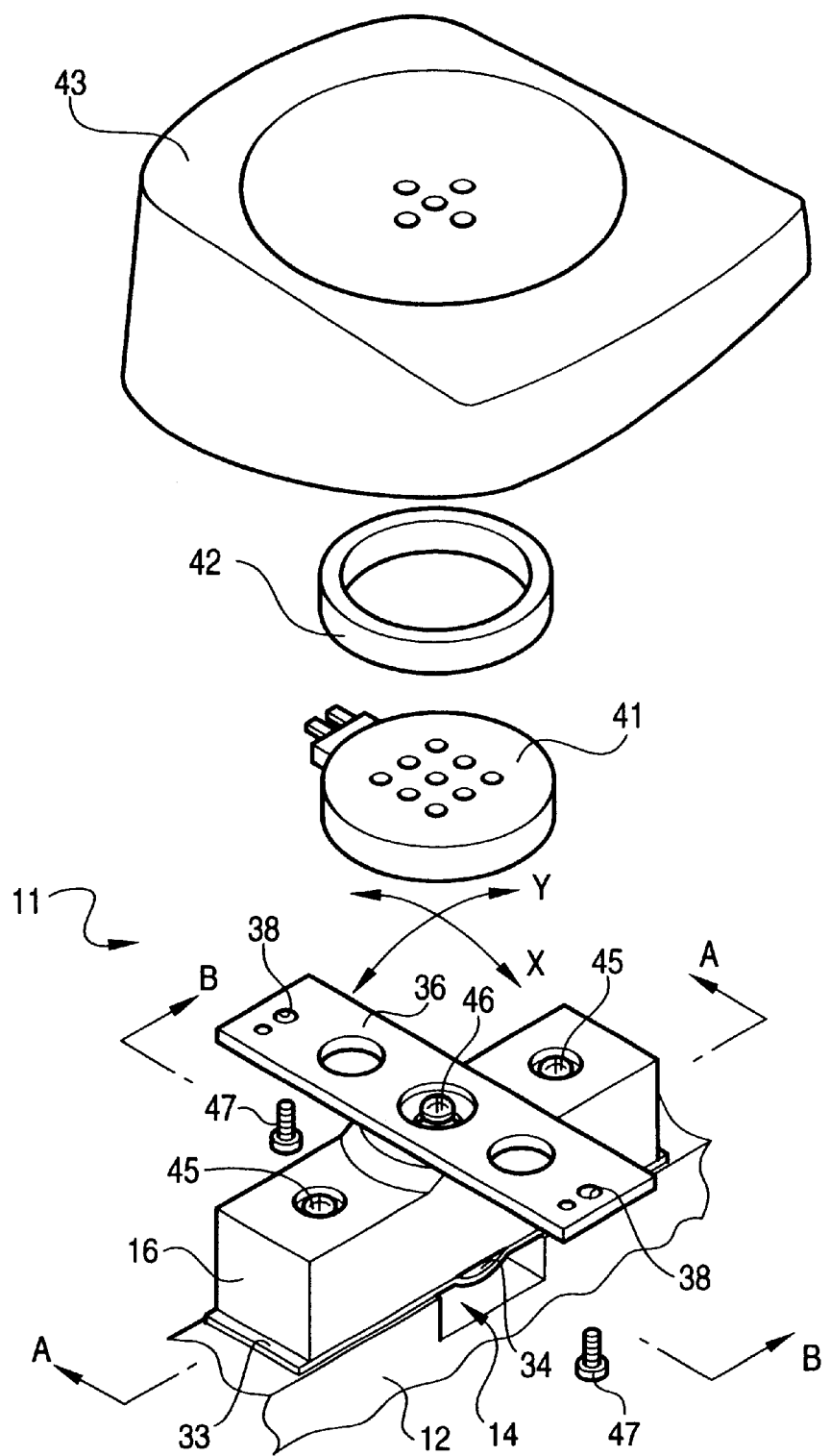
FIG. 2 is a perspective view showing the main part of the embodiment.
Figure 3:
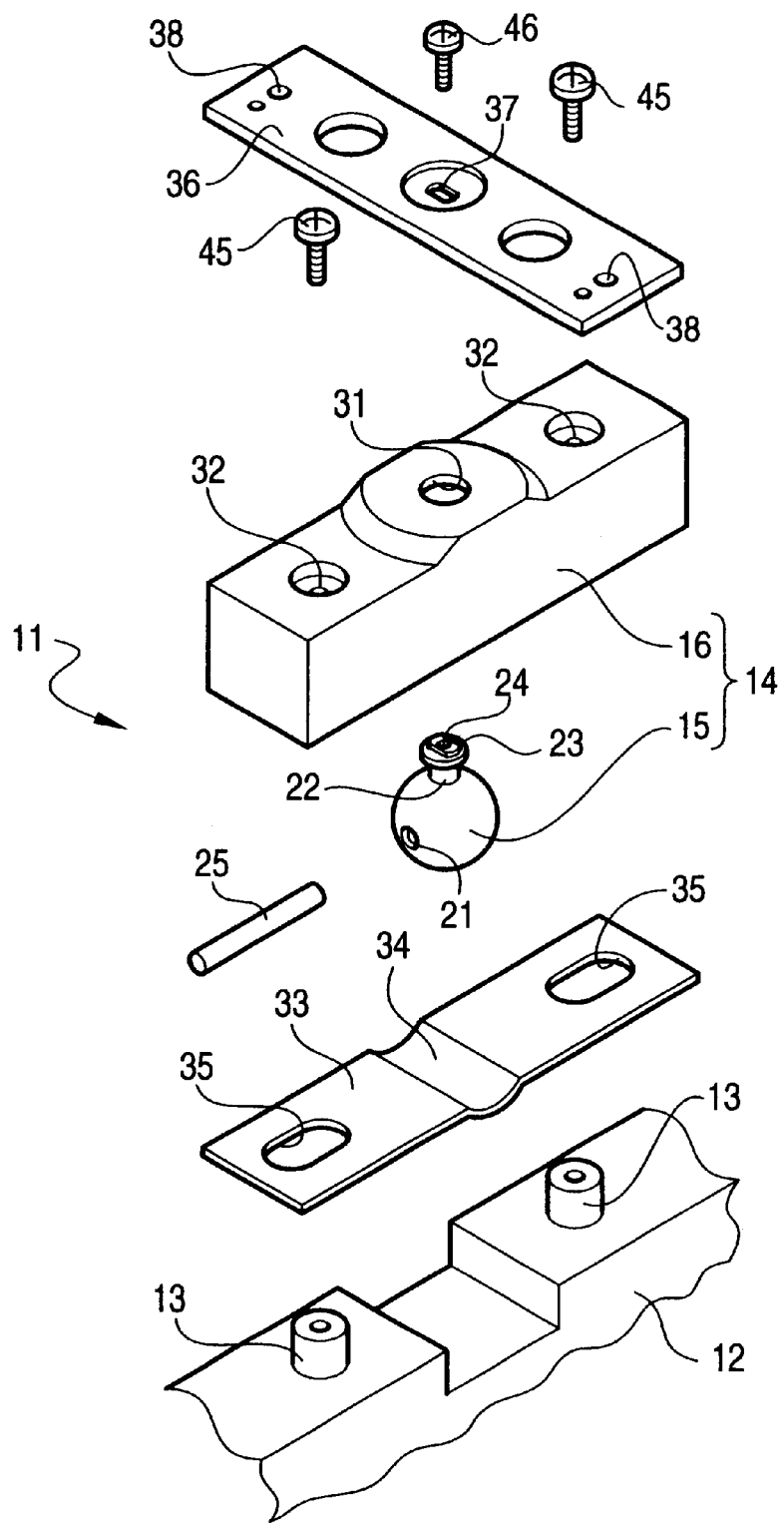
FIG. 3 is an exploded perspective view showing the main part of the embodiment.

An embodiment according to the present invention which is applied to a handset of a telephone will be described with reference to FIGS. 1 to 3.

In a handset 11 of the embodiment, a grip portion 12 is provided with projecting portions 13 at one end thereof, and tapped holes are provided in the projecting portions 13. The handset 11 is provided with a ball joint 14, and the ball joint 14 includes a ball 15 and a ball holder 16.

The ball 15 is provided with a through hole 21 penetrating substantially through the diameter thereof, a cylindrical portion 22, and a flange portion 23 and an oval projecting portion 24 which are formed at the tip portion of the cylindrical portion 22. A pin 25 is inserted through the through hole 21, and a tapped hole is formed in the cylindrical portion 22. The ball holder 16 is provided with a recess portion 26 which is substantially cylindrical, a slender groove-shaped recess portion 27 extending to both the sides of the recess portion 26, a through hole 31 which is coaxial with the recess portion 26 and larger in diameter than the cylindrical portion 22, and a through hole 32 having a large-diameter portion and a small-diameter portion.

The handset 11 is provided with a substantially-rectangular leaf spring 33, and the leaf spring 33 is provided with a recess portion 34 at the center portion thereof and through holes 35 at both sides thereof. The handset 11 is further provided with a substantially rectangular planar speaker holder 36, and the speaker holder 36 is provided with an oval through hole 37 at the center portion thereof and through holes 38 at both sides thereof.

The handset 11 includes a speaker 41, a spacer 42 formed of sponge and an ear pad 43, and tapped holes are formed in projecting portions 44 on the inner surface of the ear pad 43. The ball 15 of the ball joint 14 is inserted in the recess portion 26, and the pin 25 is also inserted in the recess portion 27. The cylindrical portion 22 of the ball 15 is projected from the through hole 31 to the outside.

The through holes 35 of the leaf spring 33 are engaged with the projecting portions 13 of the grip portion 12 so as to surround the projecting portions 13, and the large-diameter portions of the through holes 32 of the ball holder 16 are also engaged with the projecting portions 13 so as to surround the projecting portions. Screws 45 are threaded into the tapped holes of the projecting portions 13 through the through hole 32. In this state, the recess portion 34 of the leaf spring 33 presses the ball 15 against the inner surface at the through hole 31 side of the recess portion 26 of the ball holder 16. The through hole 37 of the speaker holder 36 is engaged with the projecting portion 24 of the ball 15 until the speaker holder 36 abuts against the flange portion 23 of the ball 15, and a screw 46 is threaded into the tapped hole of the cylindrical portion 22.

The spacer 42 is fitted on the inner surface of the ear pad 43, and screws 47 are threaded into the tapped holes of the projecting portions 44 of the ear pad 43 through the through holes 38 while the speaker 41 is sandwiched between the speaker holder 36 and the spacer 42, whereby the voice receiving portion comprising the speaker 41, the ear pad 43, etc. is supported by the grip portion 12. A voice transmitting portion (not shown) is fixed to the other end portion of the, grip portion 12.

In the handset 11 of this embodiment thus constructed, the diameter of the through hole 31 is larger than the diameter of the cylindrical portion 22, so that a gap is formed between the inner surface of the through hole 31 and the cylindrical portion 22 and the pin 25 abuts against neither the inner surface of the recess portion 27 at the through hole 31 side nor the leaf spring 33. Therefore, the voice receiving portion comprising the speaker 41, the ear pad 43, etc. is swingable in any direction of X-direction and Y-direction relatively to the grid portion 12. The ear pad 43 is pushed against the ear and then the press force is applied to the ear pad 43 from the ear to swing the ear pad 43 in such proper direction and angle so that the ear pad 43 is brought into close contact with the ear.

Further, since the recess portion 34 of the leaf spring 33 presses the ball 15 against the inner surface of the recess portion 26 of the ball holder 16 at the through hole 31 side, the leaf spring 33 applies a braking force to the ball 15. Therefore, even when the ear pad 43 is separated from the ear, the orientation (direction and angle) of the ear pad 43 can be kept so that the ear pad 43 can be again brought into close contact with the ear.

Still further, since the pin 25 abuts against some inner surfaces of the recess portion 27 which are vertical to the leaf spring 33, the ball 15 is prevented from rotating on the plane parallel to the leaf spring 33, and thus the relative rotation between the ear pad 43 and the grid portion 12 is prevented. In addition, since the speaker 41 is fixed to the ear pad 43, the speaker 41 is swung in the same direction as the ear pad 43 and thus the sounds emitted from the speaker 41 are easily transmitted to the ear.

The present invention is not limited to the above embodiment, and various modifications may be made without departing from the subject matter of the present invention. In the above embodiment, the present invention is applied to a handset of a telephone. However, the present invention may be applied to a handset of radio equipment or the like, and a headphone type voice receiver which merely receives voices.

What is claimed is:

1. A handset for a voice receiving mechanism, the handset comprising:

a ball joint having a ball rotatably arranged in a ball holder;

a voice receiving portion secured to said ball for listening to received voices;

a braking member for applying a braking force to said ball; and a support portion for supporting said ball holder, wherein said voice receiving portion is swingable relative to said support portion in any direction.

* * * * *